UNITED STATES PATENT OFFICE.

DANIEL FARRELL, OF SAN JOSÉ, CALIFORNIA, ASSIGNOR TO THE ANDERSON PRUNE DIPPER COMPANY, OF SAME PLACE.

PROCESS OF BLEACHING NUTS.

SPECIFICATION forming part of Letters Patent No. 663,069, dated December 4, 1900.

Application filed January 14, 1899. Serial No. 702,123. (No specimens.)

*To all whom it may concern:*

Be it known that I, DANIEL FARRELL, a citizen of the United States, residing at San José, county of Santa Clara, State of California, have invented an Improvement in Processes of Bleaching Nuts; and I hereby declare the following to be a full, clear, and exact description of the same.

My invention relates to an improvement in the art of bleaching nuts.

It consists, essentially, in the preparation of solutions of chlorid of lime and sal-soda which are mixed, and when employed for work a proportion of the solutions to be used is drawn off into a dipping vessel and a sufficient proportion of acid is added to liberate the chlorin. The nuts are then immersed in the solution and are afterward rinsed in clean water, which is preferably slightly acidulated. Nuts—such as almonds, walnuts, and similar nuts—must present a bright and clean appearance in order to be marketable and of the highest value, and in spite of all precautions the shells of the nuts become discolored and dirty. Various devices have been employed for bleaching or cleansing the nuts. One has been by sprinkling or wetting them and then placing them in a close room and applying the fumes of sulfur. In some cases the nuts have been rolled in sawdust which is impregnated with a solution of sulfurous acid. The objections to these methods are that the action upon the nuts is not uniform, that any nuts which happened to be slightly open become impregnated with sulfuric acid, and, further, the nuts subjected to this treatment are apt to become rancid within two or three months and will not keep properly.

In my process I use chlorid of lime and sal-soda. The chlorid of lime and the sal-soda are dissolved separately and afterward mixed together, and the solution is then allowed to settle until the thick white lime is at the bottom. The clear solution is then drawn off and is in readiness for use. This combination of the two solutions appears to retain its effective bleaching qualities for a much longer time than the separate chlorin solution, and it is very much more effective in its results. No white deposit is left upon the nuts, and after bleaching is completed they show no trace whatever of the solution.

When the work is to be done, a sufficient proportion of the combined solution is drawn into a dipping vessel of suitable capacity and an amount of acid is added, which will liberate the chlorin gas.

I have found that while many acids might produce the result of liberating the gas a safe acid for the purpose is acetic acid or vinegar, and of which I may use approximately one part to twenty of the solution. The nuts are then immersed coincidently with the addition of the acid and thoroughly wetted with the solution, and the escaping chlorin gas will bleach them. After having been immersed for a sufficient length of time the nuts are taken out and then rinsed in clean water, to which is preferably added a little vinegar to acidulate it, so that any of the alkali which may remain upon the surface of the nuts will unite with the acid and leave them in a clear condition. When thus treated and dried out no trace of the solution can be found upon the surface of the nuts, which are brightened and cleaned to a surprising degree.

Having thus described my invention, what I claim as new, and desire to secure by Letters Patent, is—

1. In the art of cleansing and bleaching nuts, the steps consisting in mixing a compound solution of chlorid of lime and sal-soda in a dipping vessel, adding a weak acid thereto and immediately plunging the nuts into the solution and removing them and finally washing them.

2. In the art of washing and bleaching nuts, the steps, consisting in mixing a compound solution of chlorid of lime and sal-soda in a dipping vessel, adding a weak acid thereto whereby potentially effective chlorin is liberated, and plunging the nuts in an open-work basket into the solution and immediately removing them.

In witness whereof I have hereunto set my hand.

DANIEL FARRELL.

Witnesses:
W. G. HAWLEY,
R. W. NASH.